United States Patent [19]
Hiersig

[11] 4,095,485
[45] Jun. 20, 1978

[54] ELASTIC SHAFT COUPLING WITH ATTENUATION OF TORSIONAL OSCILLATIONS

[75] Inventor: Heinz Max Hiersig, Dusseldorf, Germany

[73] Assignee: Mannesmann Aktiengesellschaft, Dusseldorf, Germany

[21] Appl. No.: 647,146

[22] Filed: Jan. 7, 1976

[30] Foreign Application Priority Data

Jan. 9, 1975 Germany ............................ 2500901

[51] Int. Cl.² ............................................. F16D 13/26
[52] U.S. Cl. ............................................ 74/574; 64/26; 64/27 NM; 64/27 R; 64/11 R
[58] Field of Search ................ 64/26, 27 NM, 27 R, 64/13, 11 R; 74/574; 188/1 B

[56] References Cited

U.S. PATENT DOCUMENTS

| | | | |
|---|---|---|---|
| 1,734,043 | 11/1929 | Nelson | 64/26 |
| 1,815,639 | 7/1931 | Wilkin et al. | 64/26 |
| 3,557,573 | 1/1971 | Hansgen | 64/13 |
| 3,727,431 | 4/1973 | Yokel | 64/27 NM |
| 3,791,497 | 2/1974 | Fleischmann et al. | 64/27 |
| 3,813,897 | 6/1974 | Hiersig et al. | 64/27 NM |

Primary Examiner—Benjamin W. Wyche
Assistant Examiner—R. C. Turner
Attorney, Agent, or Firm—Ralf H. Siegemund

[57] ABSTRACT

The elastic parts of a resilient shaft coupling are bridged by regularly arranged shock absorbers forming a regular polygon.

5 Claims, 4 Drawing Figures

ELASTIC SHAFT COUPLING WITH ATTENUATION OF TORSIONAL OSCILLATIONS

BACKGROUND OF THE INVENTION

The present invention relates to improvements for highly elastic shaft couplings.

Highly elastic shaft couplings are, for example, constructed in that two rigid annuli are disposed in concentric, radial alignment to each other, and an elastic layer or elements are interposed between them. The inner annulus is, for example, connected to the driving part and the outer annulus is connected to the drive part of the system which is drivingly interconnected by that coupling. In some cases such a coupling is used in a clutch, e.g. between the driving shaft and the active clutch.

Such elastic couplings are used, for example, in Diesel engine power plants for reducing particularly low frequency, rotational, i.e. torsional oscillations so that the plant could be run supercritically. These arrangements have been operated successfully as the inherent attenuation provided by the rubber used in the coupling sufficed, and the coupling as a whole was used only to an insignificant extent for damping the system.

Diesel-engineering has lead to a lowering of the weight-to-power ratio so that, relatively speaking, higher energizing forces coact with smaller masses in the system which is unfavorable as far as oscillations are concerned. Thus, interaction at higher frequencies in the crank shaft becomes so large that the regular oscillation dampers and attenuators of the engine are insufficient and the elastic coupling has to more actively participate in the damping. The U.S. Pat. No. 3,791,497 describes an electromagnetic system which relieves a double cone friction clutch with a highly elastic coupling portion from these oscillations. The device as disclosed therein operates quite satisfactory, but requires a separate electric circuit and components with current feeding, etc., for just that purpose.

The older German Pat. No. 905,562 discloses attenuation by means of parallelly operating elastic couplings, but it was found that the performance of the system does not improve significantly with regard to oscillations. This patent mentions also so-called omega springs to be used in the coupling, and pressurized hydraulic oil is employed for attenuation, but that method requires also a separate hydraulic system, control thereof, etc.

DESCRIPTION OF THE INVENTION

It is an object of the present invention to relieve elastic couplings from oscillations without auxiliary external energy and power source.

It is a specific object of the present invention to attenuate oscillations in a rotational system that includes an elastic coupling, without, e.g., an electric circuit or a hydraulic circuit which would require external feeding of electric current or hydraulic fluid.

In accordance with the preferred embodiment of the present invention, it is suggested to interconnect the rigid coupling parts (which are interconnected by the resilient element or elements) additionally by means of plural shock absorbers, arranged regularly about the axis of rotation. Specifically, the outer (rigid) annulus of the coupling may be connected to plural hinge-holders, and arms project from the inner annulus in-between the holders. The shock absorbers are mounted for action between the arms and the holders respectively thereby being arranged in essentially a common plane which extends transversely to the axis of rotation. It was found that the shock absorbers should be arranged to form a regular polygon which approximates a circle, i.e., their points of attachment to the system (two per absorber) should have at least approximately similar distance from the axis of rotation.

The invention was found to solve the problem in a most satisfactory manner, without requiring an external source for electric or hydraulic power, and the solution is also very economical because shock absorbers are staple articles which are mass-produced.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawing, FIGS. 1 through 3 show a primary or drive input portion 1 to be connected by coupling means to a driven or secondary part or portion 2. The part or rotational subsystem 2 includes a flange 11 to be bolted e.g. to a shaft or drive flange (not shown) of a machine to be driven, e.g. an electric generator, a transmission, etc. The drive input section or subsystem 1 includes a hub 6 to be keyed e.g. to the drive output shaft of a Diesel engine. Hub 6 is shown (FIGS. 2, 3) with a key recess for being keyed e.g. to the driving shaft (not shown). The parts 1 and 2 rotate on a common axis $x$.

Figure 1:
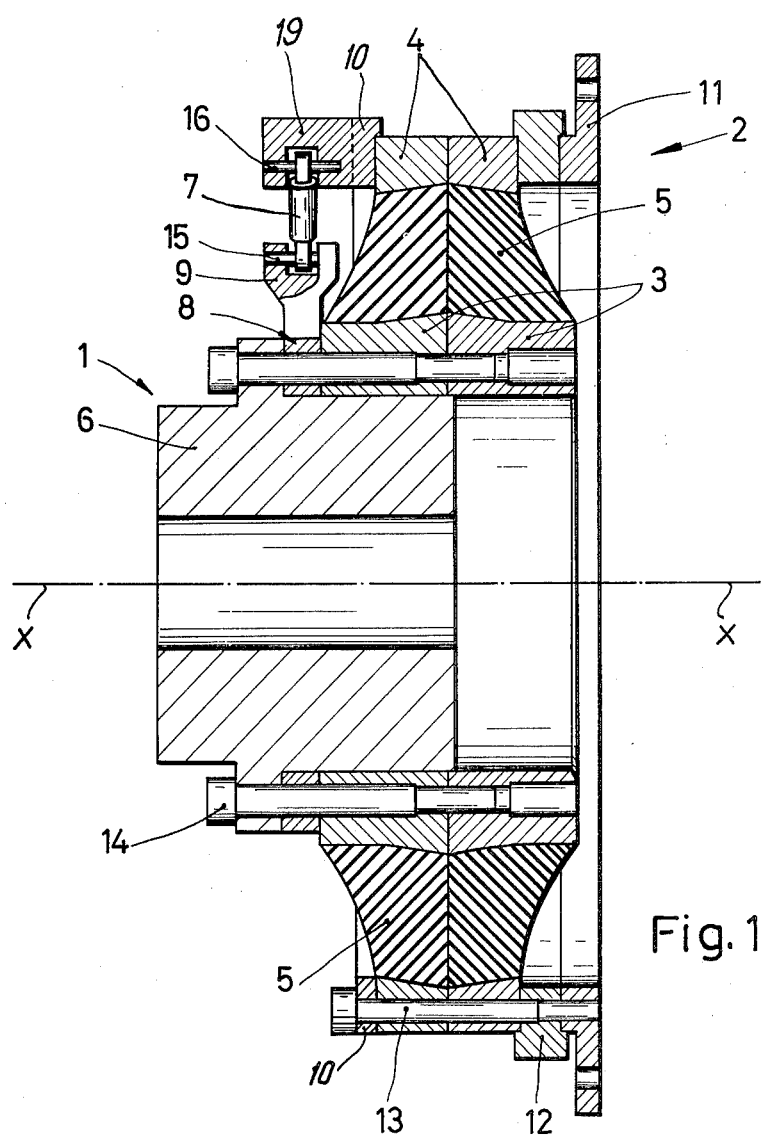
FIG. 1 is a longitudinal section view through a highly elastic shaft coupling improved in accordance with the preferred embodiment of the invention.

The coupling proper is comprised of parts 3, 4, and 5, of which 3 is a (or a pair of) rings or annuli which are bolted by means of bolts 14 to a flange of hub 6. The same bolts fasten the two annuli together. Another pair of rings or annuli 4 is bolted by means of bolts 13 to flange 11, whereby the annuli are also bolted to each other. A spacer ring 12 is interposed to prevent annuli 3 from reaching through the opening of flange 11.

The annuli 3 and 4 are respectively interconnected by means of resilient, e.g. rubber elements 5 or rubber annuli. This connection constitutes the basic coupling as between parts 1 and 2 for transmitting rotation (torque) from one to the other, while the rubber elements 5 provide resiliency for and in the connection.

Figure 2:
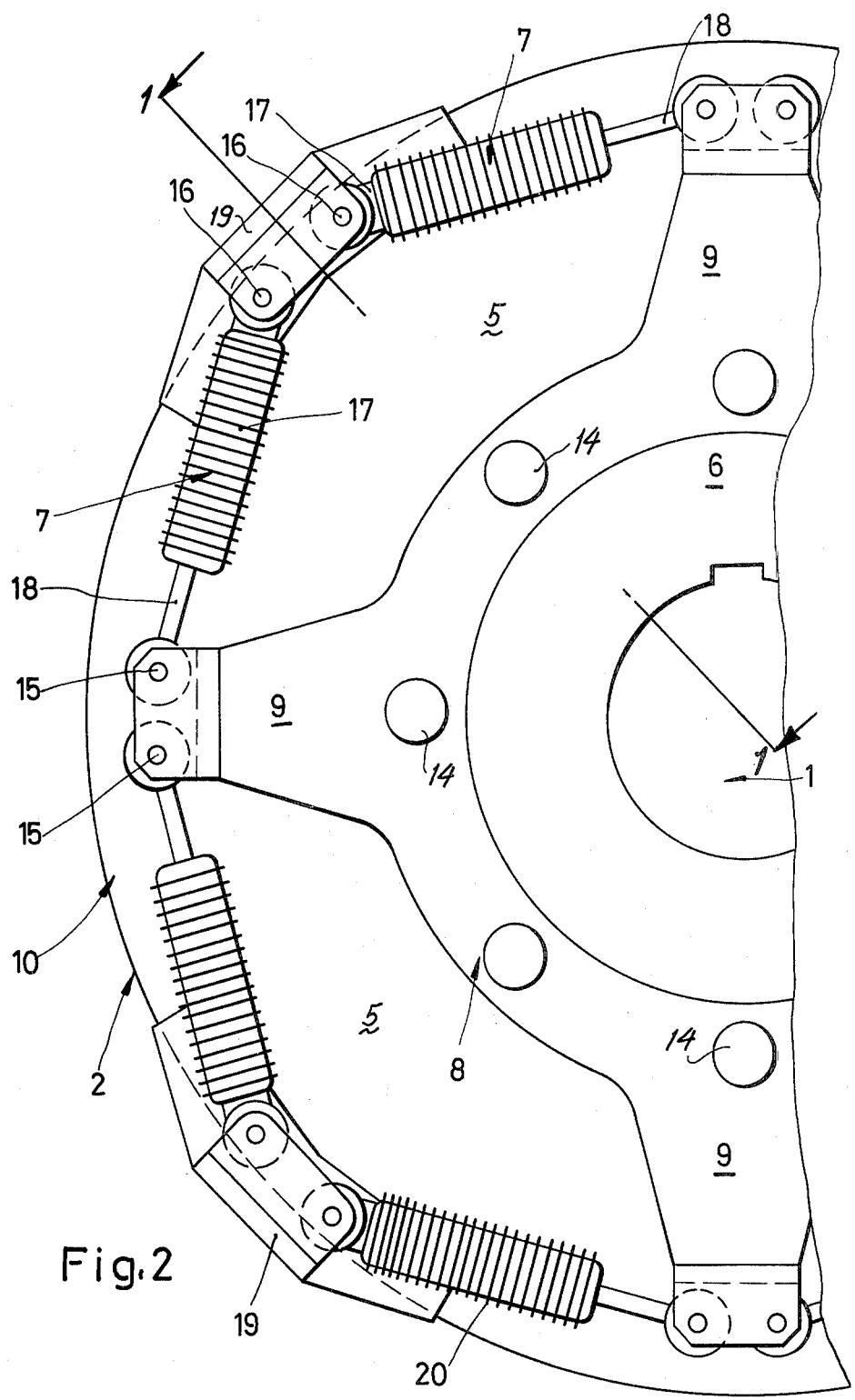
FIG. 2 is a view of a portion of the front end of the coupling shown in FIG. 1, FIG. 2 being drawn to a large scale.

A star wheel-like element 8, i.e. an annulus with four, radially, outwardly extending arms 9 is provided also on hub 6. Specifically, the ring 8 is bolted to the hub 6 together with annuli 3 by means of the same bolts 14. The star element 8 abuts the above-mentioned flange on hub 6 and is sandwiched between that flange and one of the annuli 3. A ring or annulus 10 is interposed between the heads of bolts 13 and the one annulus of the pair 4, which does not abut spacer ring 12. The ring 10 is provided with four holders 19, projecting therefrom axially and into the same plane of extension of the arms 9. The holders 19 are arranged each symmetrically to two of the arms 9. (Flange 11 has been omitted from FIGS. 2 and 3).

Hydraulic shock absorbers 7 are connected between holders 19 and arms 9, so that there are provided altogether eight such shock absorbers, each holder being connected to the respective two adjacent arms by two of these shock absorbers and vice versa. The shock absorbers are regularly arranged and define a regular octagon, whose corners are equidistantly spaced from the axis x of rotation. The cylinders are provided with colling fins or ribs 20. The shock absorbers are passive elements without external supply of hydraulic power.

Each shock absorber has a cylinder 17 and a projecting piston rod 18. The connections are made in that the outer ends of the piston rods respectively connect to the arms 9 by means of pivot pins 15 or other suitable hinge devices. Analogously, the other ends of the cylinders 17 are hinged respectively by means of pins 16 to the holders 19. It can thus be seen that all of the shock absorber cylinders are connected in a symmetrical pattern to the driven portion 2 of the coupling and constitute a part thereof while the piston rods all connect to star wheel 8 which is connected to and constitutes a part of the drive input portion 1 of the coupling. The connection could be in the reverse.

Figure 3:
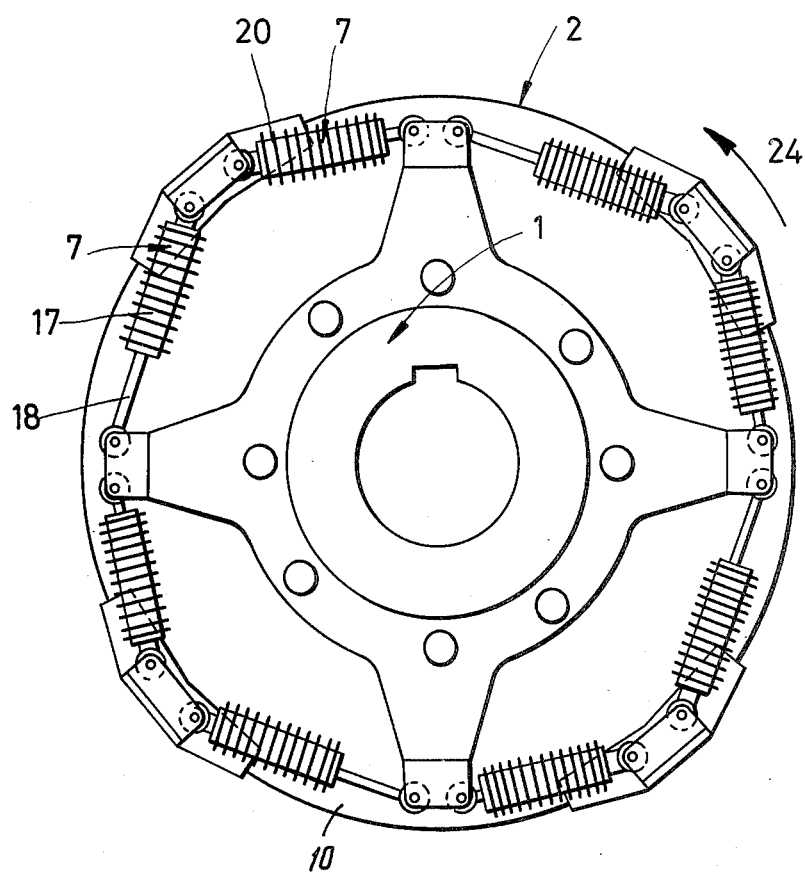
FIG. 3 is a similar and complete front view, on a smaller scale, and showing the coupling under load.

FIG. 3 shows the shock absorber supplement of the coupling under load. The arrow 24 denotes the direction of rotation. If 1 constitutes the driving and 2 the driven portion of the coupling, the latter (being under load) can be expected to be angularly phase-shifted. Half of the shock absorbers have their respective piston rods projecting more than normal and the remaining shock absorbers have their piston rods projecting less. One can see that the supplemental shock attenuation as established by these shock absorbers is independent from the relative phase shift between driving and driven coupling parts for a considerable angular range.

Figure 4:
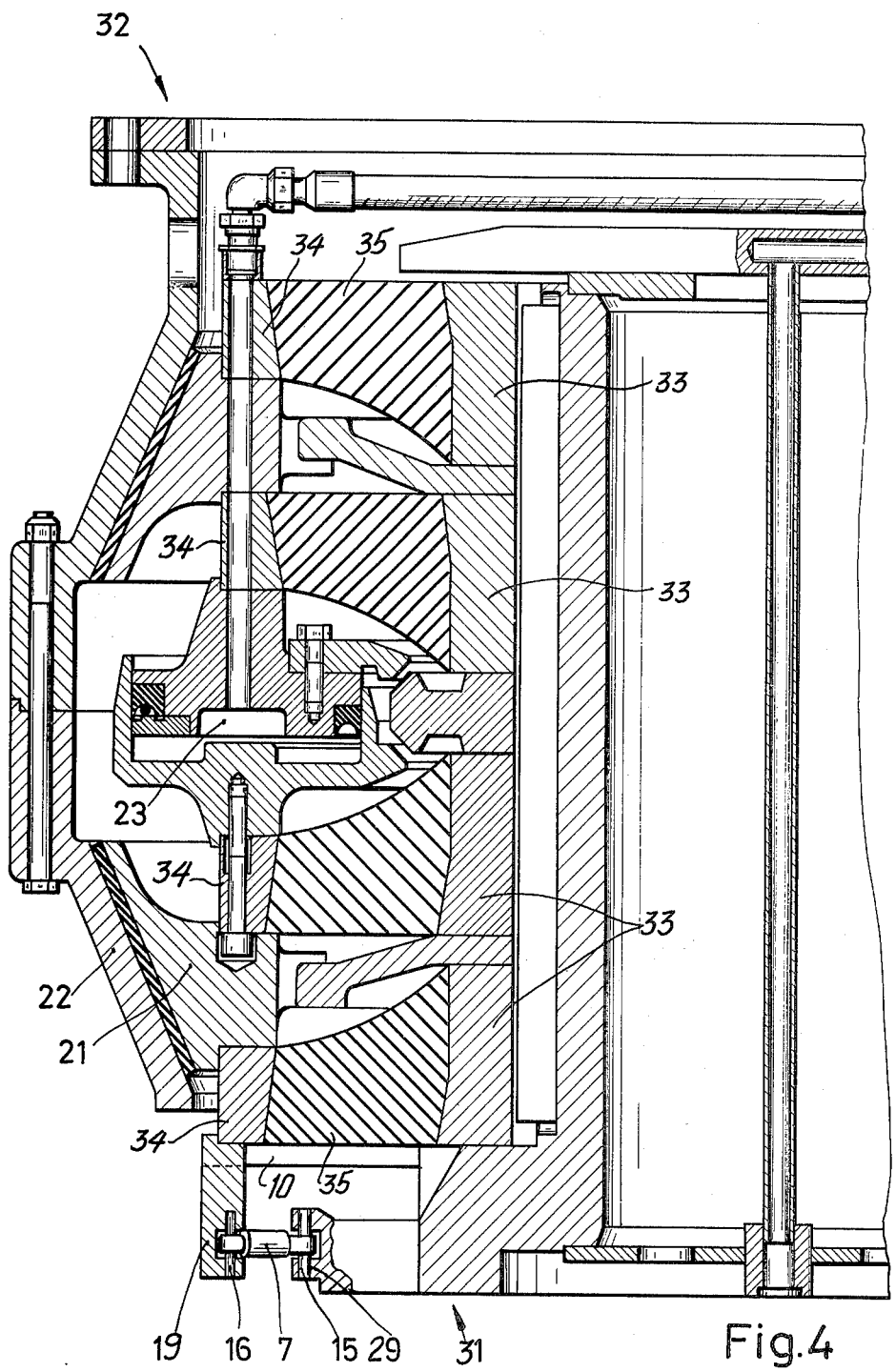
FIG. 4 is a longitudinal section view through a double cone clutch also improved in accordance with the preferred embodiment.

Turning now to the example of FIG. 4, the figure shows a drive part 31 and a driven part 32 including also a flange to which is bolted the casing 22 of a double cone friction clutch. The casing has, at least internally, the configuration of a double cone for cooperation with a pari of cones 21 which in turn have their outer conical surface provided with friction linings.

The hub element of driving part 31 is provided with four annuli 33 while each of the cone members 21 is connected to two of altogether four outer annuli 34. Radially aligned annuli 33, 34 are interconnected by rubber resilient elements 35. The two clutch cones 21 are operatively interconnected by an annular piston cylinder arrangement 23. Such clutches are shown, for example, in U.S. letters Pat. Nos. 3,708,048, 3,804,220 and others. Suffice it to say that the active clutch parts, namely cones 21, take the part of the driven elements for purposes of the invention. In other words, the coupling is provided here as between the driving hub and the clutch cones. Thus, an annulus 10 with holders 19 is connected here to one of the annuli 34. The driving part 31 is provided here with integral arms 29 having the same function as arms 9 in FIGS. 1 to 3. Thus, there are provided shock absorbers 7 and they are hinged by means of pins 15 and 16 to the arms 29 and holders 19 respectively and as described above.

The examples have been described above under the assumption that, as to the coupling, the inner annuli and the star member or configuration (8; 9; 29) pertain to the driving portion and the outer annuli to which annulus 10 with holders 19 connect are driven via the resilient coupling portion. However, the relation could be reversed; the inventive shock attenuation will function in either case.

The invention is not limited to the embodiments described above, but all changes and modifications thereof not constituting departures from the spirit and scope of the invention are intended to be included.

I claim:

1. In a highly elastic coupling having a first, inner annular coupling portion and a second, outer annular coupling portion connected to the first portion via radially extending elastic means for rotation about a common axis, the improvement comprising:
    a plurality of radially extending arms connected to said first coupling portion;
    a plurality of holders connected to said second coupling portion, extending axially therefrom and being symmetrically interspaced between said arms;
    a plurality of shock absorbers regularly arranged about said axis and connected respectively to said arms and said holders so that each holder and each arm is connected to two of said shock absorbers, so that the shock absorbers act parallelly to the elastic means to obtain attenuation of rotational oscillations of the parts relative to each other.

2. In a coupling as in claim 1, wherein said arms and said holders extend in substantially the same plane.

3. In a coupling as in claim 1, wherein said holders are all mounted on an annulus, said annulus being connected to said second portion.

4. In a coupling as in claim 1, wherein each shock absorber has a cylinder and a piston rod, one of the cylinder and piston rod of each absorber being connected to the first portion, the other one to the second portion.

5. In a coupling as in claim 1, said shock absorbers being provided with means for cooling.

* * * * *